(12) United States Patent
Kano

(10) Patent No.: US 10,549,805 B2
(45) Date of Patent: Feb. 4, 2020

(54) STRADDLED VEHICLE

(71) Applicant: YAMAHA HATSUDOKI KABUSHIKI KAISHA, Iwata-shi, Shizuoka-ken (JP)

(72) Inventor: Yasunobu Kano, Shizuoka (JP)

(73) Assignee: YAMAHA HATSUDOKI KABUSHIKI KAISHA, Iwata-Shi, Shizuoka-Ken (JP)

( * ) Notice: Subject to any disclaimer, the term of this patent is extended or adjusted under 35 U.S.C. 154(b) by 116 days.

(21) Appl. No.: 15/843,007

(22) Filed: Dec. 15, 2017

(65) Prior Publication Data

US 2018/0170470 A1 Jun. 21, 2018

(30) Foreign Application Priority Data

Dec. 15, 2016 (JP) .................................. 2016-242929

(51) Int. Cl.
| | |
|---|---|
| *B62J 9/00* | (2006.01) |
| *B62J 3/00* | (2006.01) |
| *B62J 1/28* | (2006.01) |
| *B62J 1/12* | (2006.01) |
| *B62J 99/00* | (2009.01) |

(52) U.S. Cl.
CPC ................. *B62J 9/001* (2013.01); *B62J 1/12* (2013.01); *B62J 1/28* (2013.01); *B62J 3/00* (2013.01); *B62J 2099/0006* (2013.01)

(58) Field of Classification Search
CPC ............... B62J 9/00; B62J 9/001; B62J 9/006
See application file for complete search history.

(56) References Cited

U.S. PATENT DOCUMENTS

| 4,163,513 A | * | 8/1979 | Kramer ..................... B62J 9/00 224/413 |
|---|---|---|---|
| 10,065,698 B1 | * | 9/2018 | Sliwa ........................ A45C 5/14 |
| 2008/0174099 A1 | * | 7/2008 | Brown ....................... B62J 7/04 280/854 |
| 2010/0077807 A1 | * | 4/2010 | Takeuchi ................ B60R 11/00 70/158 |
| 2012/0025486 A1 | * | 2/2012 | Armitage ............ B60R 11/0217 280/288.4 |
| 2012/0187167 A1 | * | 7/2012 | Salisbury ................... B62J 7/04 224/413 |
| 2013/0240584 A1 | * | 9/2013 | Nagayoshi ............... B62J 9/001 224/413 |

(Continued)

FOREIGN PATENT DOCUMENTS

JP 2000-128043 A 5/2000

*Primary Examiner* — Tony H Winner
(74) *Attorney, Agent, or Firm* — Rabin & Berdo, P.C.

(57) ABSTRACT

A storage box is provided rearward of a seat in a plan view of a vehicle, and a backrest is provided between the seat and the storage box. A pair of left and right speaker devices is provided to sandwich the backrest in a vehicle width direction. The storage box includes a main body and a lid portion. The lid portion is coupled to the main body by a pair of left and right link mechanisms, and is turned between an open position in which an opening of the main body is opened and a close position in which the opening of the main body is closed. With the lid portion in the open position, part of the lid portion is positioned forward of a rear end of the backrest in the plan view of the vehicle.

8 Claims, 15 Drawing Sheets

(56) References Cited

U.S. PATENT DOCUMENTS

| | | | |
|---|---|---|---|
| 2016/0200384 A1* | 7/2016 | Reinhart | B62J 9/001 224/413 |
| 2017/0247074 A1* | 8/2017 | Dery St-Cyr | B62J 7/02 |
| 2019/0152550 A1* | 5/2019 | Hendricks | B62J 1/08 |

* cited by examiner

STRADDLED VEHICLE

BACKGROUND OF THE INVENTION

Field of the Invention

The present invention relates to a straddled vehicle.

Description of Related Art

There has been a straddled vehicle including a trunk behind a seat. In JP 2000-128043 A, the trunk for a motorcycle is described. This trunk is provided rearward of a driver seat and a passenger seat. The trunk includes a trunk main body and a lid body. A backrest for a passenger is attached to a front end of the lid body. The lid body is attached to the trunk main body by a hinge to be turnable. Specifically, an upper half portion and a lower half portion of the hinge are fixed to a front surface of the lid body and a front surface of the trunk main body, respectively. The upper half portion and the lower half portion of the hinge are coupled to each other by a coupling pin.

In the above-mentioned trunk, when the lid body is opened, the backrest provided at the front end of the lid body comes into contact with the passenger seat. If the thickness of the backrest increases, interference between the backrest and the passenger seat increases, and the lid body cannot be largely opened. Therefore, it is difficult to take the luggage in and out from the trunk main body. On the other hand, if the thickness of the backrest is reduced, a cushioning property of the backrest and comfort of the passenger are reduced.

Further, it is considered that the backrest is provided to be fixed to the trunk main body and the lid body is provided rearward of the backrest to be turnable instead of provision of the backrest at the lid body. However, it is necessary to reduce the size of the lid body in that case. Therefore, a space for taking the luggage in and out from the trunk main body is restricted, and accessibility to the trunk body is reduced.

SUMMARY

An object of the present invention is to provide a straddled vehicle in which luggage can be easily taken in and out from a storage box without a reduction in comfort of a rider.

(1) A straddled vehicle according to one aspect of the present invention includes a seat, a storage box provided rearward of the seat in a vehicle front-and-rear direction in a plan view of the vehicle, a backrest provided between the seat and the storage box in the plan view of the vehicle; and a pair of left and right speaker devices provided to sandwich the backrest in a vehicle width direction, wherein the storage box includes a main body having a first opening that is opened upward in a vehicle top-and-bottom direction, a lid portion provided to be able to open and close the first opening, and a pair of left and right unequal length link mechanisms that couples the lid portion to the main body such that the lid portion is turnable between an open position in which the first opening is opened and a close position in which the first opening is closed, each of the pair of speaker devices includes a speaker unit that generates sound, and a speaker cover that forms a speaker storage space in which the speaker unit is stored, the speaker unit is directed forward in the vehicle front-and-rear direction, inward in the vehicle width direction and upward in the vehicle top-and-bottom direction, with the lid portion in the close position, parts of the pair of unequal length link mechanisms are respectively positioned in the speaker storage spaces of the pair of speaker devices, and with the lid portion in the open position, part of the lid portion is positioned forward of a rear end of the backrest in the vehicle front-and-rear direction in the plan view of the vehicle.

In this straddled vehicle, the storage box having the main body and the lid portion is provided rearward of the seat and the backrest. The lid portion is coupled to the main body by the pair of left and right unequal length link mechanisms to be turnable between the open position and the close position. With the lid portion in the open position, part of the lid portion is positioned forward of the rear end of the backrest in the vehicle front-and-rear direction. In this case, the lid portion can be turned between the close position and the open position so as not to interfere with the backrest. Thus, it is possible to largely open the lid portion without reducing the thickness of the backrest. Therefore, cushioning property of the backrest can be ensured, and luggage can be easily taken in and out from the main body of the storage box.

Further, the speaker unit of the speaker device is directed forward, inward and upward. In this case, a rider who is seated on the seat easily hears the sound, and a certain space is ensured in the speaker storage space. As such, with the lid portion in the close position, each link mechanism is arranged such that part of each link mechanism protrudes forward from the main body of the storage box and is positioned in the speaker storage space. Thus, a space occupied by the link mechanism in the main body can be reduced. Therefore, storage capacity for the luggage in the main body can be increased.

(2) Each of the pair of unequal length link mechanisms may include a first link member fixed to the main body, a second link member fixed to the lid portion, and third and fourth link members that couple the first link member to the second link member, the first link member may have a first coupler, and a second coupler positioned forward of the first coupler in the vehicle front-and-rear direction, the second link member may have a third coupler, and a fourth coupler positioned forward of the third coupler in the vehicle front-and-rear direction with the lid portion in the close position, the third link member may be attached to the first and third couplers to be turnable such that a distance between the first coupler and the third coupler is maintained, the fourth link member may be attached to the second and fourth couplers such that a distance between the second coupler and the fourth coupler is maintained, and the distance between the first coupler and the third coupler may be larger than the distance between the second coupler and the fourth coupler. In this case, the lid portion can be turned between the close position and the open position without interference with the backrest and complication of the configuration of the link mechanism.

(3) Each of the pair of unequal length link mechanisms may further include a damper having first and second end portions, the first link member may further have a first attachment portion to which the first end portion of the damper is attached, the second link member may further have a second attachment portion to which the second end portion of the damper is attached, and the damper may bias the respective first and second link members in directions in which the respective first and second attachment portions move away from each other.

In this case, shock generated when the lid portion is opened and closed is eased by the damper. Further, because the first and second link members are respectively biased in directions in which the first attachment portion and the second attachment portion move away from each other, the lid portion can be turned from the close position to the open position without application of a large force.

(4) The damper may have an axial center passing through the first and second end portions, and with the lid portion in the close position, an extending line of the axial center of the damper may pass through a position above the fourth coupler of the second link member in the vehicle top-and-bottom direction in a side view of the vehicle. In this case, with the lid portion in the close position, a biasing force of the damper is exerted in a direction in which the lid portion is maintained in the close position. Therefore, even when vibration, shock or the like is applied to the storage box during travelling of the vehicle, the lid portion can be stably maintained in the close position.

(5) The third link member may move in a first plane as the lid portion turns, the fourth link member may move in a second plane as the lid portion turns, and the damper may be arranged to move in a third plane, which is positioned between the first plane and the second plane, as the lid portion turns. In this case, imbalance of exertion of the biasing force of the damper on each link mechanism is prevented. Thus, good mechanical balance is acquired in each link mechanism. Therefore, deformation and damage of each link mechanism are prevented, and good operability of each link mechanism is acquired.

(6) With the lid portion in the close position, parts of the pair of unequal length link mechanisms may respectively overlap with the speaker unit of the pair of speaker devices in the side view of the vehicle. In this case, a space ensured in the speaker cover can be effectively utilized, and the size of the speaker device can be inhibited from increasing.

(7) The straddled vehicle may further include a pair of left and right storage spaces respectively provided below the pair of speaker devices, wherein each of the pair of storage spaces may include a casing having a second opening, and a storage lid portion provided to be able to open and close the second opening. When storage capacity of the main body of the storage box is increased, a space is formed below the pair of speaker devices. Thus, the pair of storage spaces is provided in the space, so that it is possible to increase storage capacity of the main body without forming a wasteful space.

(8) The main body may include a pair of left and right lower wall portions, and a pair of left and right upper wall portions provided above the pair of lower wall portions in the vehicle top-and-bottom direction in a side view of the vehicle, the pair of upper wall portions may be positioned inward of the pair of lower wall portions in the plan view of the vehicle, a pair of left and right support surfaces may be formed to couple lower ends of the pair of upper wall portions to upper ends of the pair of lower wall portions, and the pair of unequal length link mechanisms may be respectively fixed onto the pair of support surfaces.

In this case, because the pair of upper wall portions is positioned inward of the pair of link mechanisms, each link mechanism is prevented from interfering with the luggage being taken in and out from the main body. Further, the luggage is prevented from sticking out from the first opening by the pair of upper wall portions. Thus, the luggage is prevented from being caught between the main body and the lid portion.

Other features, elements, characteristics, and advantages of the present invention will become more apparent from the following description of preferred embodiments of the present invention with reference to the attached drawings.

DETAILED DESCRIPTION

A motorcycle according to embodiments of the present invention will be described below with reference to drawings. The motorcycle is one example of a straddled vehicle.

[1] Motorcycle

Figure 1:
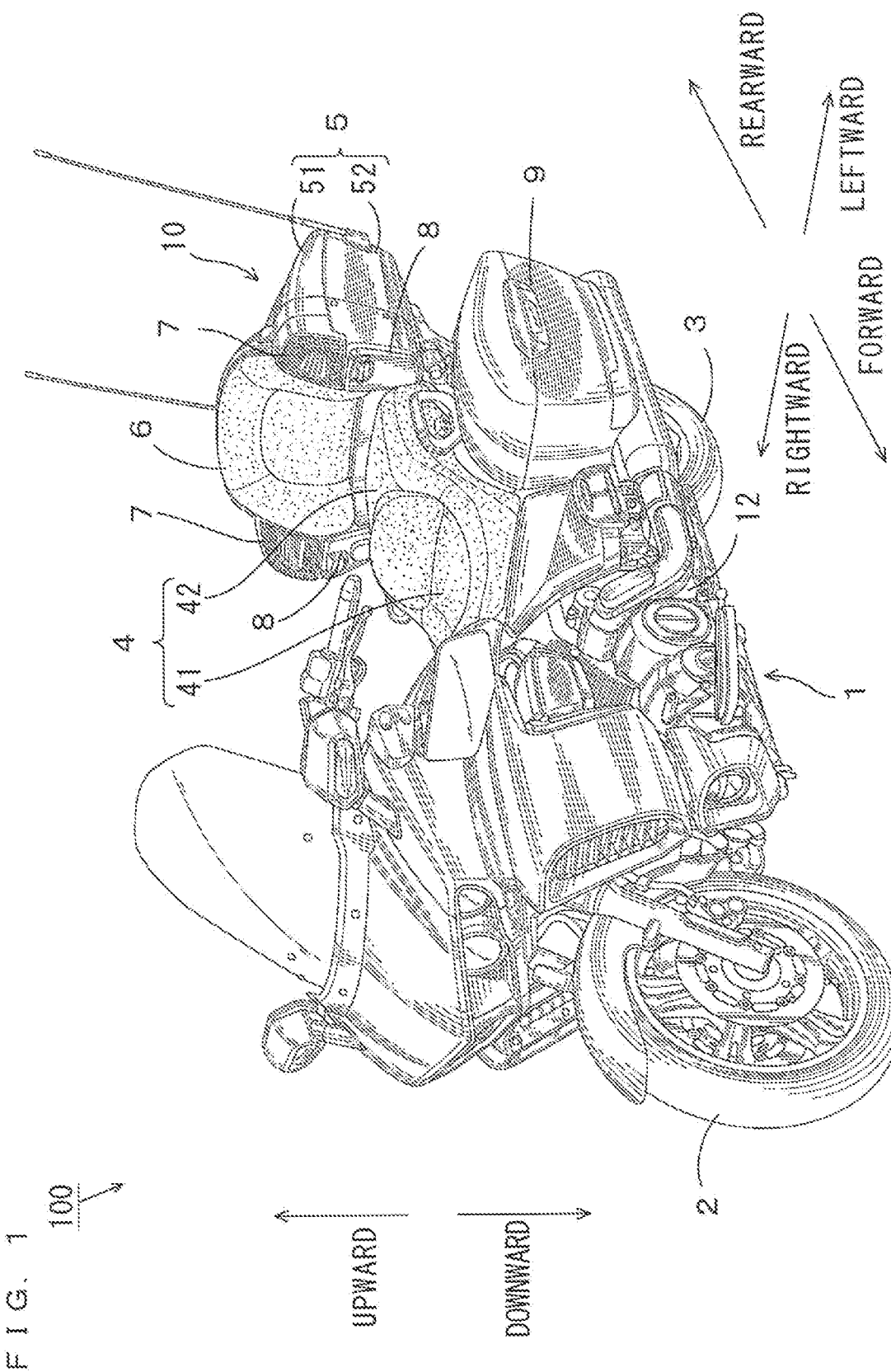
FIG. 1 is an external perspective view of a motorcycle according to one embodiment of the present invention.
Figure 2:
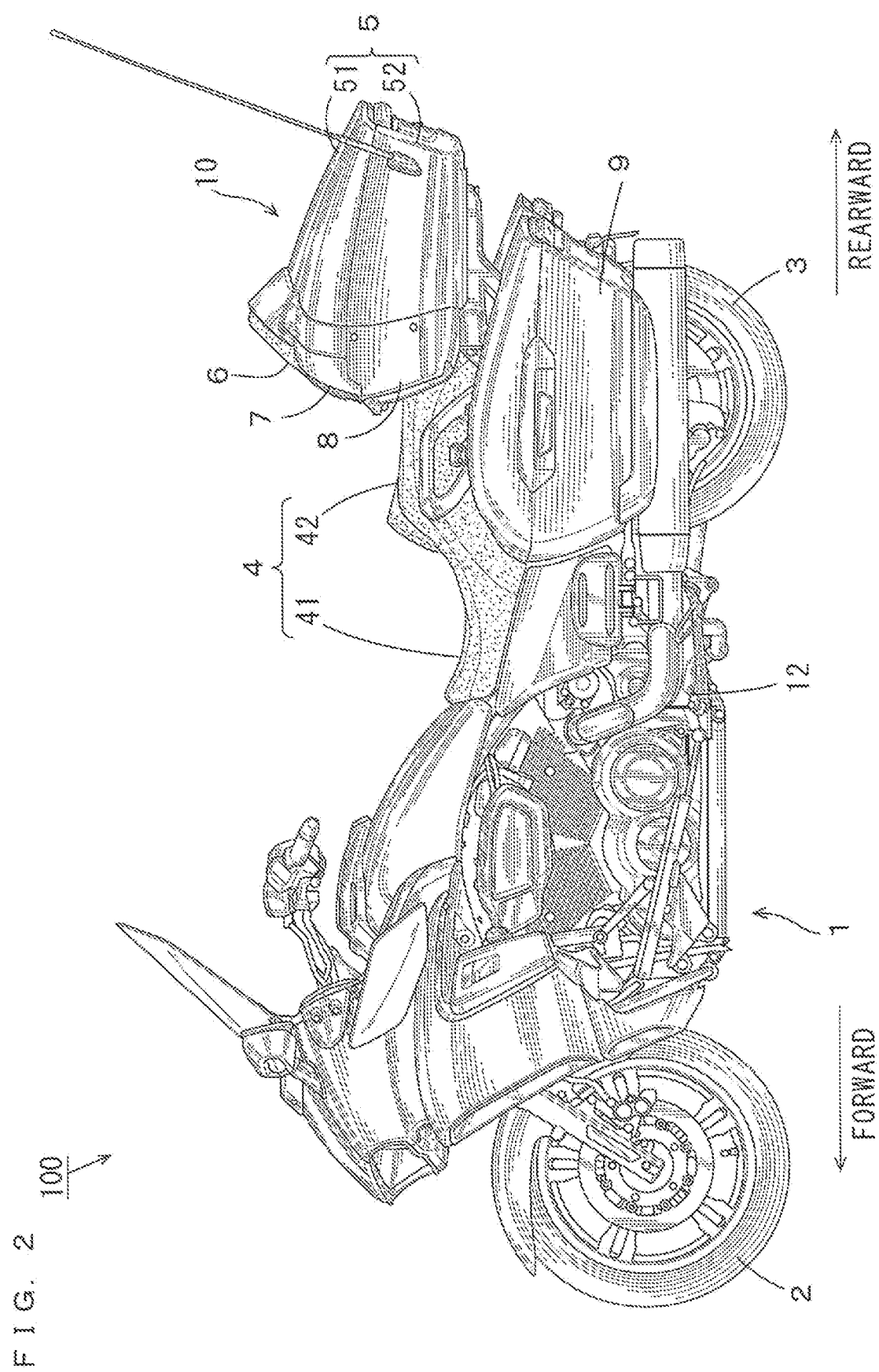
FIG. 2 is a side view of the motorcycle of FIG. 1.

FIG. 1 is an external perspective view of the motorcycle according to one embodiment of the present invention. FIG. 2 is a side view of the motorcycle of FIG. 1, and FIG. 3 is a plan view of the motorcycle of FIG. 1.

Figure 3:
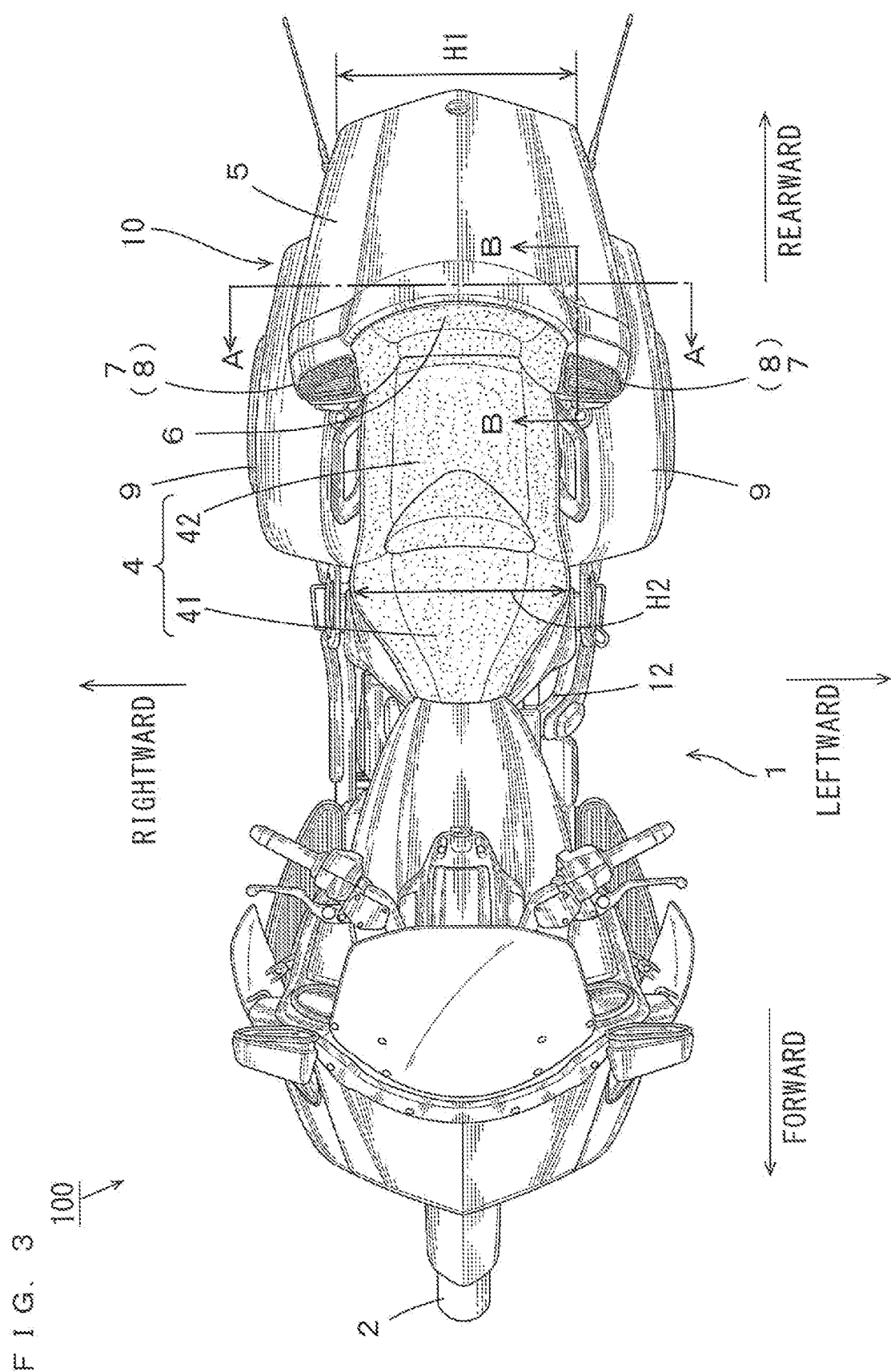
FIG. 3 is a plan view of the motorcycle of FIG. 1.

As shown in FIGS. 1 to 3, the motorcycle 100 includes a main body 1, a front wheel 2, a rear wheel 3, a seat 4 and a rear unit 10. The main body 1 includes a main frame (not shown) and an engine 12. Hereinafter, a front-and-rear direction, a width direction and a top-and-bottom direction that are based on the main body 1 are referred to as a vehicle front-and-rear direction, a vehicle width direction and a vehicle top-and-bottom direction, respectively. Further, in the following description, forward and rearward mean forward and rearward in the vehicle front-and-rear direction, rightward and leftward mean rightward and leftward in the vehicle width direction, and upward and downward mean upward and downward in the vehicle top-and-bottom direction. Further, a plan view of the vehicle means that the motorcycle 100 is viewed downward from a position above the motorcycle 100. A side view of the vehicle means that the motorcycle 100 is viewed leftward from a position rightward of the motorcycle 100, or that the motorcycle 100 is viewed rightward from a position leftward of the motorcycle 100. Arrows that indicate directions are shown in each of FIG. 1 and subsequent drawings.

The front wheel 2 and the rear wheel 3 are rotatably attached to a front portion and a rear portion of the main body 1 to support the main body 1, respectively. The seat 4 is provided in an upper portion of the main body 1. The seat 4 includes a driver seat 41 and a passenger seat 42. The passenger seat 42 is provided rearward of the driver seat 41. A seat surface of the passenger seat 42 is positioned higher than a seat surface of the driver seat 41.

The rear unit 10 is provided rearward of the passenger seat 42. The rear unit 10 includes a storage box 5, a backrest 6, a pair of left and right speaker devices 7 and a pair of left and right storage spaces 8. The storage box 5 includes a main body 51 and a lid portion 52. The lid portion 52 is coupled to the main body 51 by a pair of below-mentioned link mechanisms 53 to be turnable.

The backrest 6 is positioned between the seat 4 and the storage box 5 in the plan view of the vehicle (FIG. 3). The backrest 6 extends upward from a position above a rear end of the passenger seat 42 while tilting rearward. A passenger who is seated on the passenger seat 42 can lean his or her back against the backrest 6. The pair of left and right speaker devices 7 is provided to sandwich the backrest 6 in the vehicle width direction. The pair of left and right storage spaces 8 is provided below the pair of speaker devices 7. Relatively small luggage can be stored in each storage space 8. As shown in FIG. 3, a dimension (width) of the storage box 5 in the vehicle width direction gradually decreases rearward. Further, a dimension H1 of a rear end of the storage box 5 in the vehicle width direction is equal to or larger than a maximum dimension H2 of the seat 4 in the vehicle width direction.

In the present example, a pair of storage boxes 9 is also provided at the left and right of the main body 1. In the plan view of the vehicle, the pair of storage boxes 9 is positioned at the left and right of the passenger seat 42, the backrest 6 and a front half of the rear unit 10 (FIG. 3).

Figure 4:
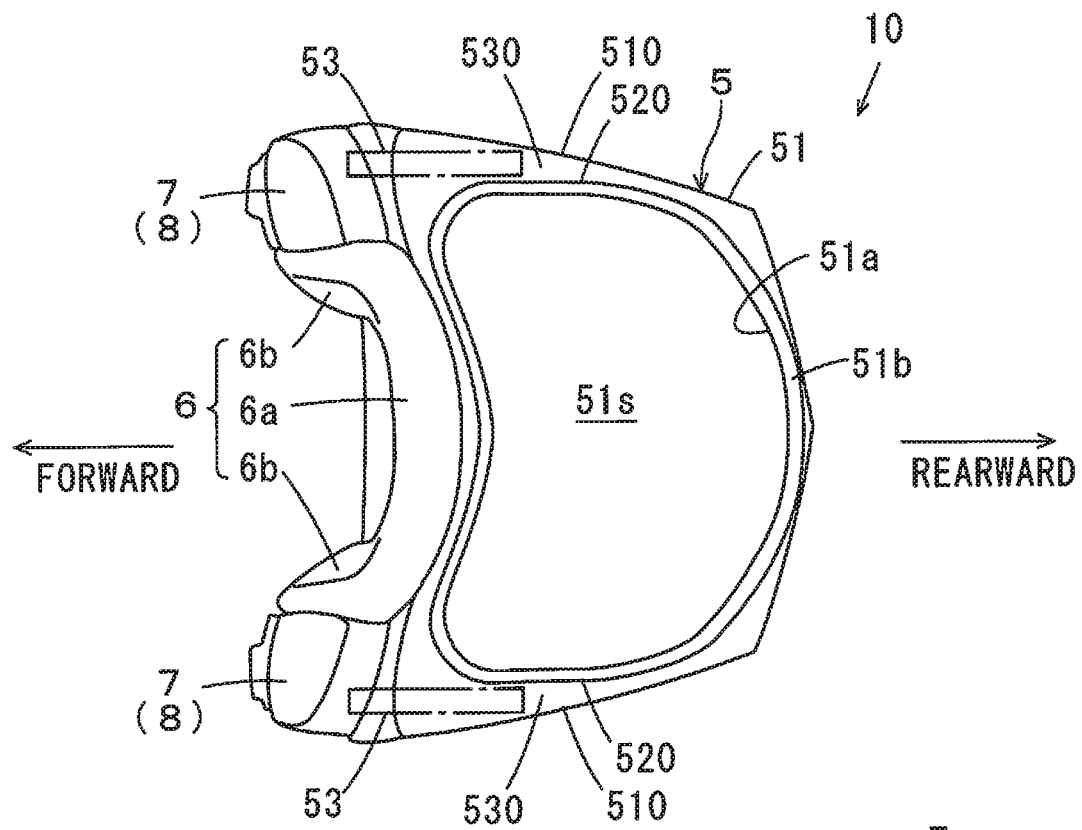
FIG. 4 is a plan view of a rear unit with a lid portion of a storage box detached.

FIG. 4 is a plan view of the rear unit 10 with the lid portion 52 of the storage box 5 detached. As shown in FIG. 4, the main body 51 of the storage box 5 has an opening 51a that is opened upward. A storage space 51s in which relatively large luggage such as a helmet can be stored is formed inside of the main body 51. The luggage is taken in and out from the storage space 51s through the opening 51a. A seal member 51b with no end is attached to an edge of the opening 51a. The seal member 51b adheres to a lower surface of the lid portion 52 (FIGS. 1 to 3), so that particles, liquid and the like are prevented from entering the storage space 51s.

The backrest 6 includes a back surface portion 6a and a pair of left and right side surface portions 6b. The back surface portion 6a extends in the top-and-bottom direction at a position forward of a center portion of the storage box 5. The back surface portion 6a has a shape that is curved to slightly project rearward. The pair of side surface portions 6b extends forward from left and right ends of the back surface portion 6a while tilting outward in the plan view of the vehicle. The pair of speaker devices 7 is positioned outward of the pair of side surface portions 6b in the vehicle width direction. At the left and right of the opening 51a of the main body 51 and the backrest 6, a pair of left and right link mechanisms 53 is arranged to extend in the vehicle front-and-rear direction from the main body 51 into the speaker device 7. The lid portion 52 is turned by the pair of link mechanisms 53 between an open position in which the opening 51a of the main body 51 is opened and a close position in which the opening 51a of the main body 51 is closed. The open position is a position of the lid portion 52 which is in a maximum opened state.

Figure 5:
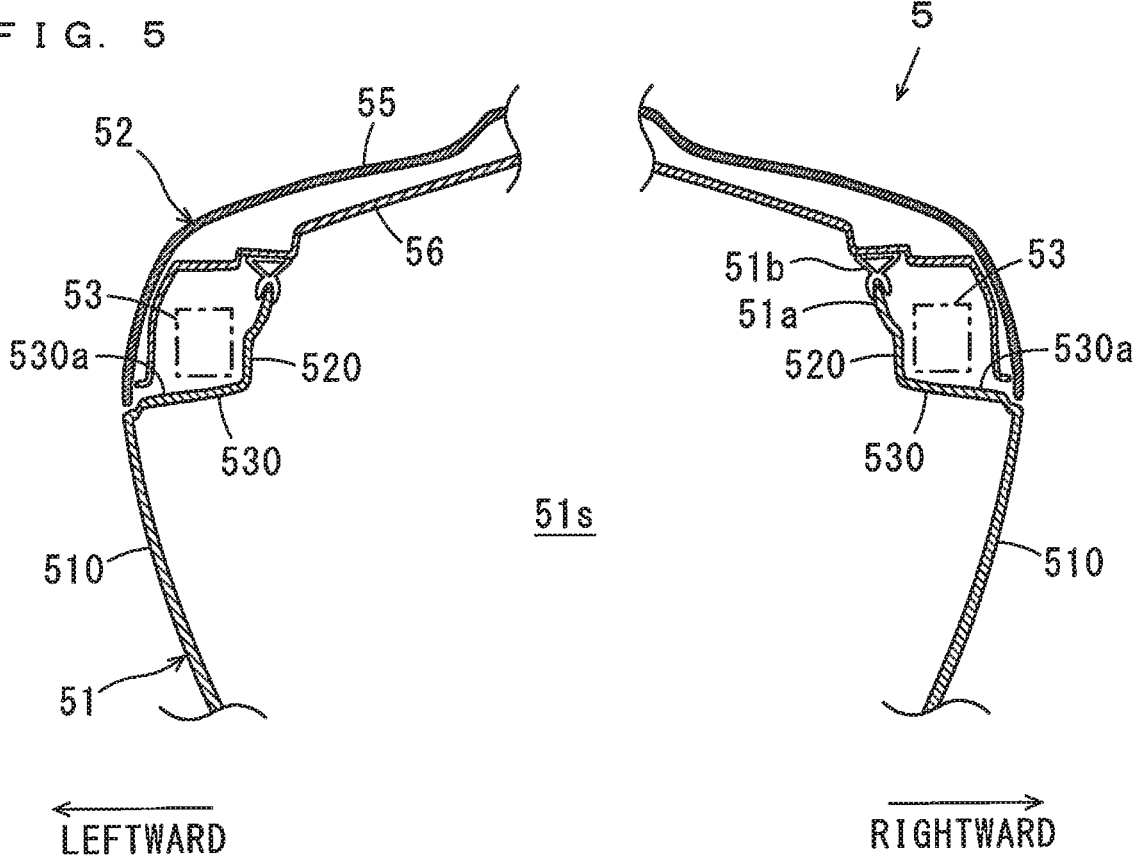
FIG. 5 is a cross sectional view of the storage box.

FIG. 5 is a cross sectional view of the storage box 5. A cross section of FIG. 5 corresponds to a cross sectional view taken along the line A-A of FIG. 3. As shown in FIG. 5, the main body 51 includes a pair of left and right lower wall portions 510, a pair of left and right upper wall portions 520 and a pair of left and right middle portions 530. The pair of lower wall portions 510 extends upward while expanding in the vehicle width direction. The pair of middle portions 530 respectively extends inward in the vehicle width direction from upper ends of the pair of lower wall portions 510. The pair of upper wall portions 520 respectively extends upward from inner ends of the pair of middle portions 530. Upper ends of the pair of upper wall portions 520 respectively constitute part of the opening 51a. In the plan view of the vehicle, the pair of upper wall portions 520 is positioned inward of the pair of lower wall portions 510 (see FIG. 4). Further, in the side view of the vehicle, the pair of upper wall portions 520 is positioned upward of the pair of lower wall portions 510 (see FIGS. 9, 11 and 12, described below).

The lid portion 52 is a two-layer structure, and includes an upper member 55 and a lower member 56. When the lid portion 52 is in the close position, a space is ensured between each middle portion 530 and the lower member 56. Each middle portion 530 has a support surface 530a directed upward. The pair of link mechanisms 53 is arranged on the pair of support surfaces 530a, respectively.

Because the pair of upper wall portions 520 is positioned inward of the pair of link mechanisms 53 in the vehicle width direction, each link mechanism 53 is prevented from interfering with the luggage being taken in and out from the main body 51. Further, the luggage is prevented from sticking out from the opening 51a by the pair of upper wall portions 520. Thus, when the lid portion 52 is turned from the open position to the close position, the luggage is prevented from being caught between the main body 51 and the lid portion 52.

Figure 6:
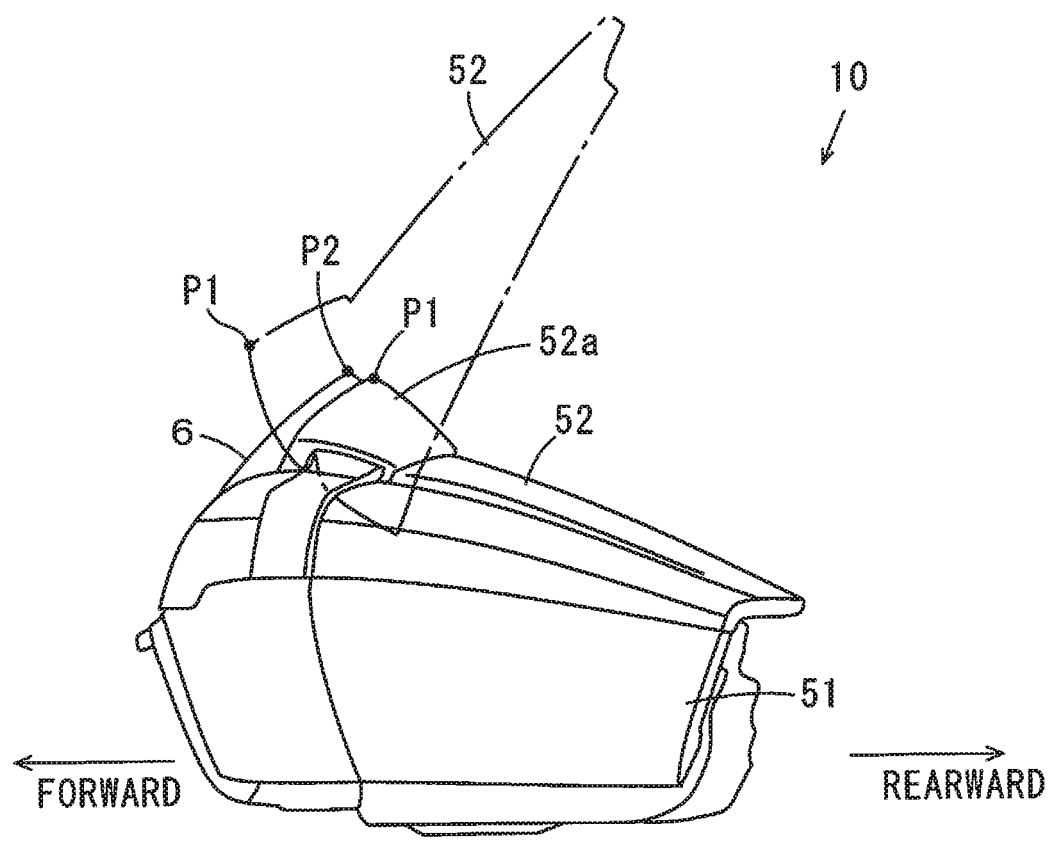
FIG. 6 is a side view of the rear unit.

FIG. 6 is a side view of the rear unit 10. A backrest cover 52a is provided a center front portion of the lid portion 52. With the lid portion 52 in the close position, the backrest cover 52a covers a rear portion of the back surface portion 6a of the backrest 6. Hereinafter, an upper end of the backrest cover 52a in the case where the lid portion 52 is in the close position is referred to as an end P1. In FIG. 6, the lid portion 52 being in the open position is indicated by a one-dot and dash line. When in the close position, the end P1 of the lid portion 52 is positioned rearward of an upper end P2 of the backrest 6 and at a height substantially equal to a height of the upper end P2 of the backrest 6. When in the open position, the end P1 of the lid portion 52 is positioned forward of the upper end P2 and upward of the upper end P2. In the present embodiment, the pair of link mechanisms 53 enables the lid portion 52 to turn between the close position and the open position without interference with the backrest 6.

[2] Link Mechanisms

Figure 7:
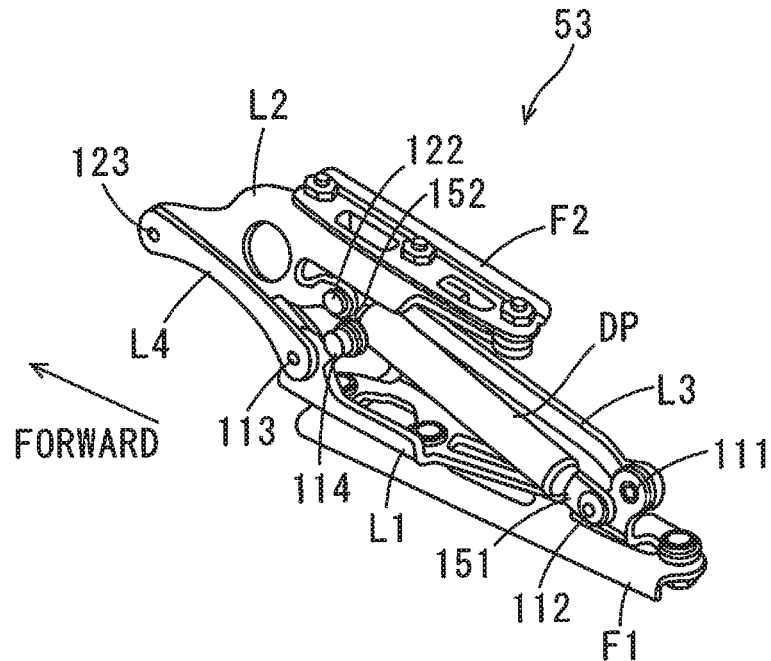
FIG. 7 is an external perspective view of a link mechanism.
Figure 8:
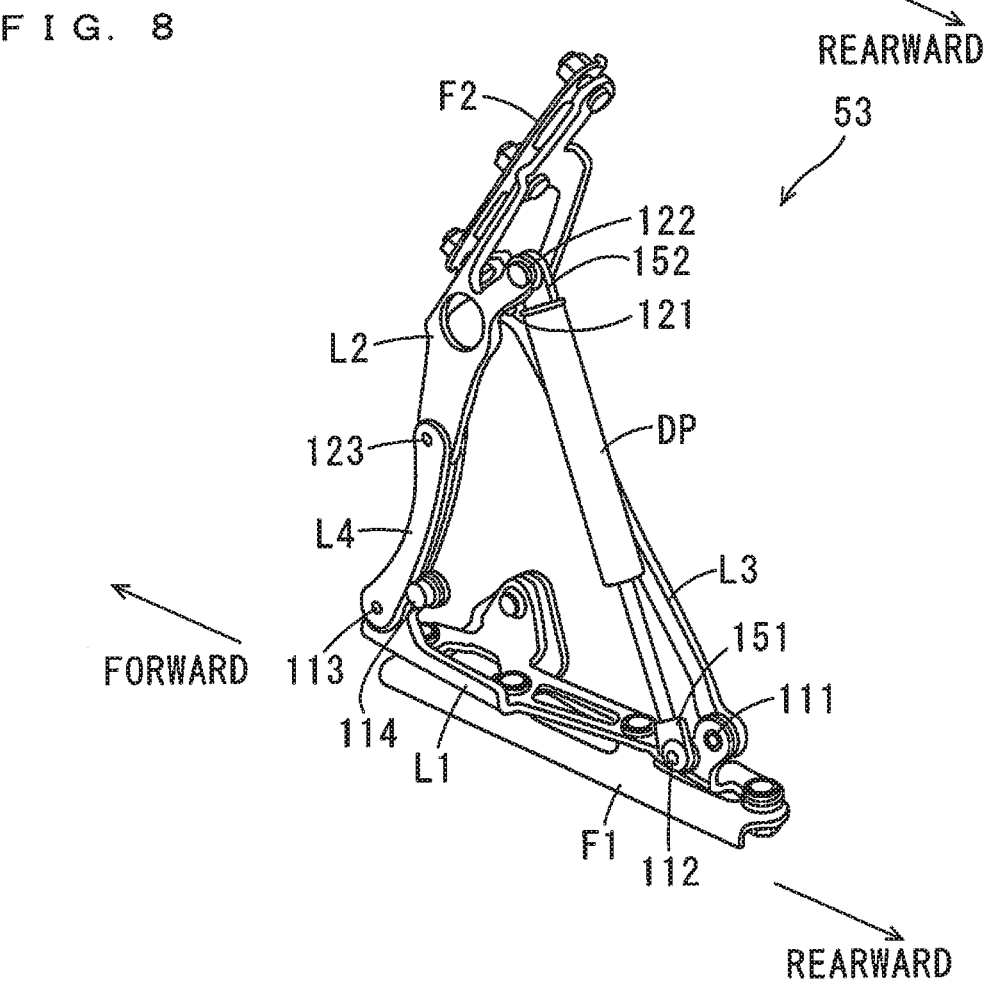
FIG. 8 is an external perspective view of the link mechanism.

Hereinafter, a state where the lid portion 52 of the storage box 5 is in the close position is referred to as a close state, and a state where the lid portion 52 of the storage box 5 is in the open position is referred to as an open state. Each of FIGS. 7 and 8 is an external perspective view of the link mechanism 53. The link mechanism 53 in the close state is shown in FIG. 7, and the link mechanism 53 in the open state is shown in FIG. 8. A left link mechanism 53 of the pair of left and right link mechanisms 53 is shown in each of FIGS. 7 and 8. A right link mechanism 53 has a configuration laterally symmetric with that of the left link mechanism 53.

As shown in FIGS. 7 and 8, the link mechanism 53 includes elongated link members L1, L2, L3, L4 and a damper DP. A fixing member F1 is attached to the link member L1. The middle portion 530 (FIG. 5) of the main body 51 is arranged between the link member L1 and the fixing member F1. The link member L1 and the fixing member F1 are fastened to each other by a plurality of bolts and a plurality of nuts, so that the link member L1 is fixed onto the support surface 530a (FIG. 5) of the middle portion 530 to extend in the vehicle front-and-rear direction. A coupler 111 and a damper attachment portion 112 are provided at one end (a rear end) of the link member L1, and a coupler 113 and an engaging portion 114 are provided at the other end (a front end) of the link member L1.

A fixing member F2 is attached to the link member L2. The lower member 56 (FIG. 5) of the lid portion 52 is arranged between the link member L2 and the fixing member F2. The link member L2 and the fixing member F2 are fastened to each other by a plurality of bolts and a plurality of nuts, so that the link member L2 is fixed to the lower member 56. A coupler 121 (FIG. 8) and a damper attachment portion 122 are provided in a middle portion of the link member L2, and a coupler 123 is provided at one end (a front end) of the link member L2.

One end of the link member L3 is coupled to the coupler 111 of the link member L1 to be turnable. The other end of the link member L3 is coupled to the coupler 121 (FIG. 8) of the link member L2 to be turnable. One end of the link member L4 is coupled to the coupler 113 of the link member L1 to be turnable. The other end of the link member L4 is coupled to the coupler 123 of the link member L2 to be turnable.

A distance between the coupler 111 of the link member L1 and the coupler 121 of the link member L2 is maintained by the link member L3, and a distance between the coupler 113 of the link member L1 and the coupler 123 of the link member L2 is maintained by the link member L4. The distance between the coupler 111 of the link member L1 and the coupler 121 of the link member L2 is larger than the distance between the coupler 113 of the link member L1 and the coupler 123 of the link member L2.

The damper DP is a gas damper, for example. A coupling piece 151 is provided at one end of the damper DP, and a coupling piece 152 is provided at the other end of the damper DP. The coupling piece 151 is coupled to the damper attachment portion 112 of the link member L1 to be turnable. The coupling piece 152 is coupled to the damper attachment portion 122 of the link member L2 to be turnable. The link member L3 is arranged rightward of the damper DP, and the link member L4 is arranged leftward of the damper DP.

The damper DP biases the link members L1, L2 in directions in which the damper attachment portion 112 of the link member L1 and the damper attachment portion 122 of the link member L2 move away from each other. A distance between the damper attachment portion 112 of the link member L1 and the damper attachment portion 122 of the link member L2 changes as the lid portion 52 (FIG. 6) is turned. In this case, the damper DP extends and contracts while absorbing shock between the main body 51 and the lid portion 52.

The link mechanism 53 in the present embodiment is a four-link mechanism having the link members L1 to L4, and a degree of freedom is 1. Therefore, movements of the link members L1 to L4 are fixed. Further, the link mechanism 53 in the present embodiment is an unequal length link mechanism with two turning links having unequal lengths. In the unequal length link mechanism, movements of the two turning links are asymmetric with each other. In the present example, lengths of the link members L3, L4 are different from each other, and movements of the link members L3, L4 are asymmetrical with each other.

Figure 9:
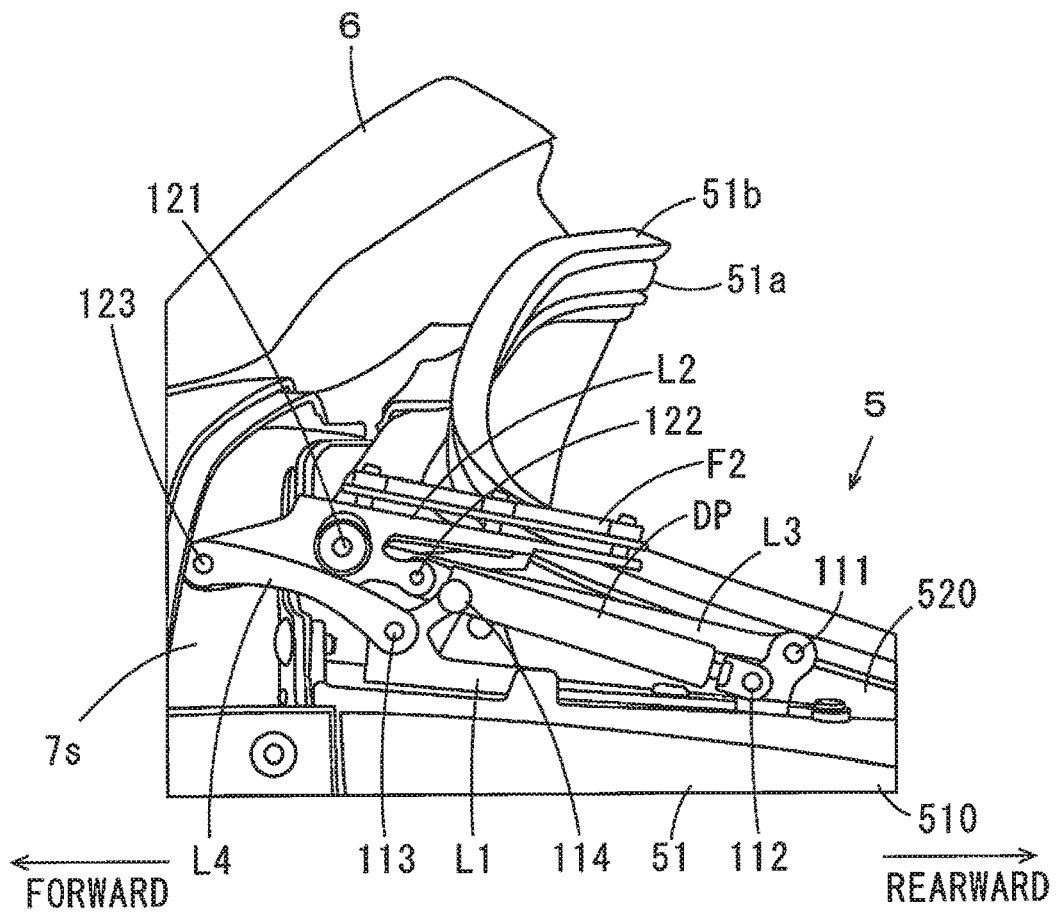
FIG. 9 is a side view of the link mechanism and its peripheral portions in a close state.
Figure 10:
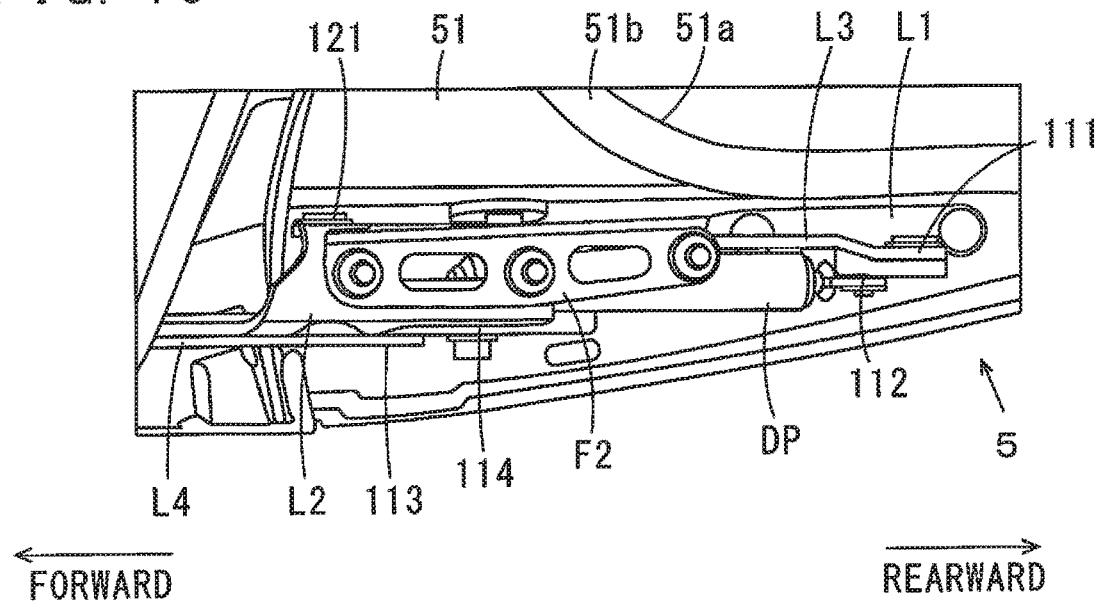
FIG. 10 is a plan view of the link mechanism and its peripheral portions in the close state.
Figure 11:
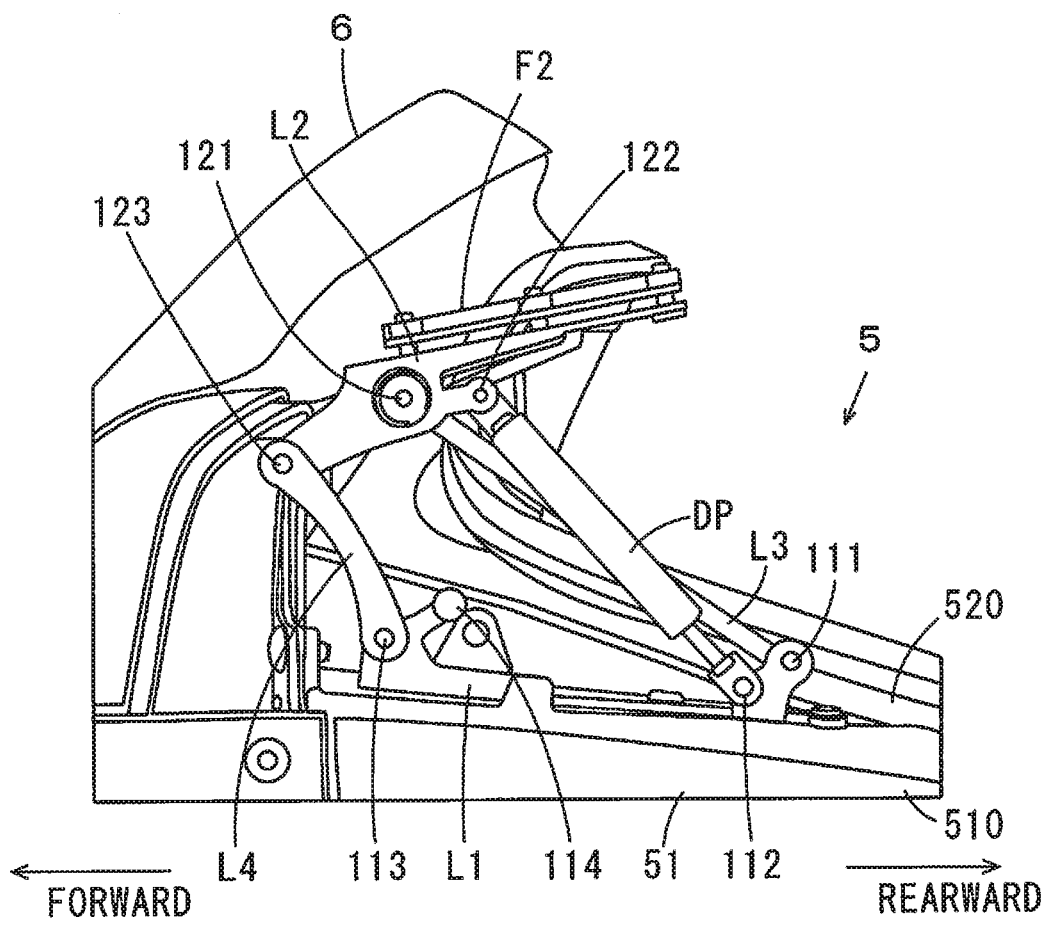
FIG. 11 is a side view of the link mechanism and its peripheral portions in a state between the close state and an open state.
Figure 12:
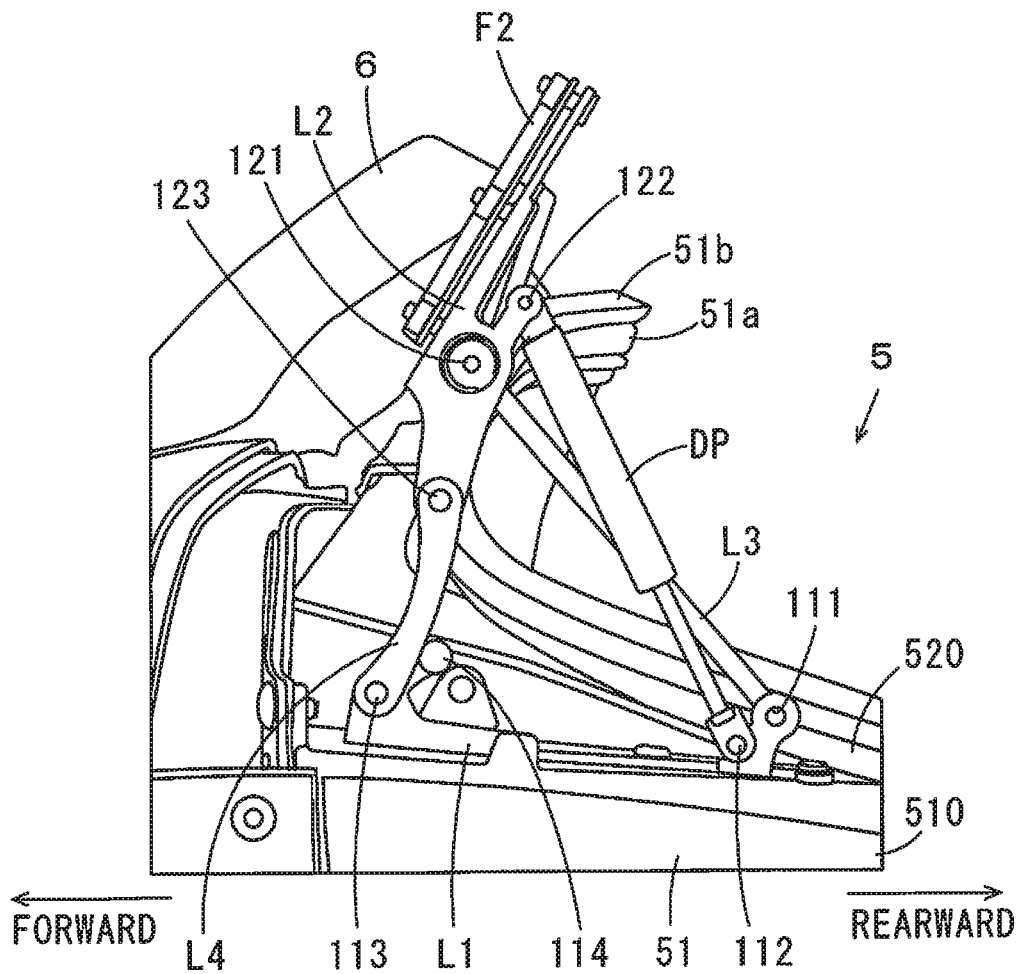
FIG. 12 is a side view of the link mechanism and its peripheral portions in the open state.
Figure 13:
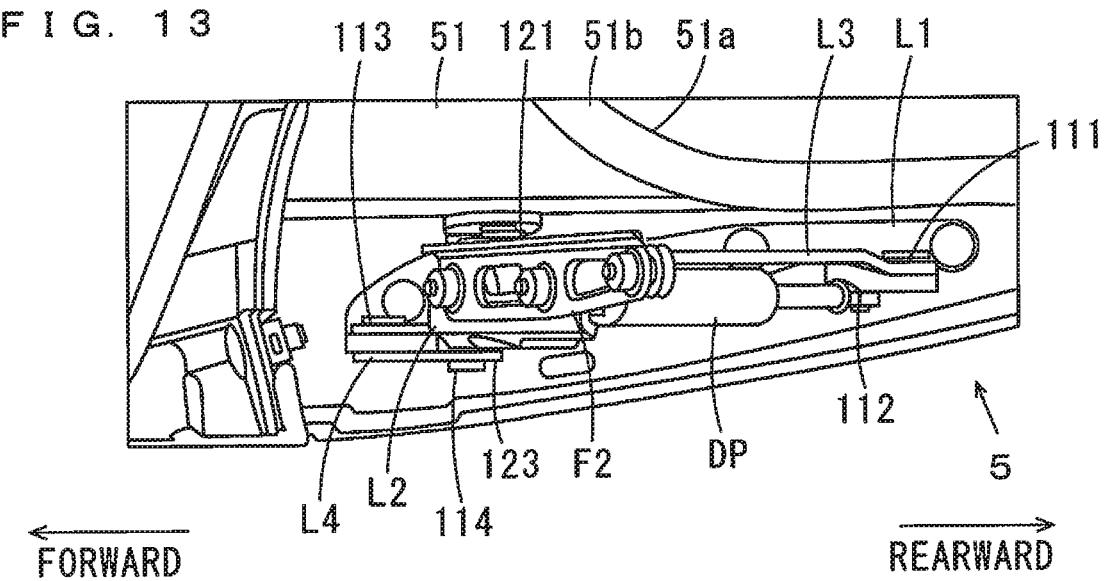
FIG. 13 is a plan view of the link mechanism and its peripheral portions in the open state.

The movement of the link mechanism 53 in the case where the lid portion 52 changes from the close state to the open state will be described. FIGS. 9 and 10 are a side view and a plan view of the link mechanism 53 and its peripheral portions in the close state. FIG. 11 is a side view of the link mechanism 53 and its peripheral portions in a state between the close state and the open state. FIGS. 12 and 13 are a side view and a plan view of the link mechanism 53 and its peripheral portions in the open state. In each of FIGS. 9 to 13, only a left link mechanism 53 of the pair of link mechanisms 53 is shown. The movement of the right link mechanism 53 is laterally symmetric with the movement of the left link mechanism 53. In each of FIGS. 9 to 13, the lid portion 52 is not shown.

As shown in FIGS. 9 and 10, in the close state, the link members L3, L4 are largely tilted forward from the couplers 111, 113 of the link member L1. The couplers 121, 123 of the link member L2 are positioned forward of the coupler 113 of the link member L1. Further, the damper DP is largely tilted forward from the damper attachment portion 112 of the link member L1. The damper attachment portion 122 of the link member L2 is positioned in the vicinity of the coupler 113 of the link member L1. The link member L2 and the link member L1 are in close proximity to each other, and respectively substantially horizontal.

The coupler 123 of the link member L2 is positioned forward of a front end of the main body 51 of the storage box 5. Therefore, part of the link members L2, L4 protrudes forward from the front end of the main body 51, and is positioned in a speaker storage space 7s. The speaker storage space 7s will be described below.

As shown in FIG. 11, when the lid portion 52 changes from the close state to the open state, the respective link members L3, L4 turn rearward with the respective couplers 111, 113 of the link member L1 as respective centers. In this case, a biasing force of the damper DP is exerted in a direction in which the link members L3, L4 turn rearward, whereby the lid portion 52 can change from the close state to the open state without application of a large force.

The link member L2 moves rearward as the link members L3, L4 turn. Thus, the entire link member L2 is pulled out of the speaker storage space 7s. Further, the coupler 121 of the link member L2 is higher than the coupler 123. Thus, a rear end of the link member L2 is higher than a front end of the link member L2. An attitude of the link member L2 changes to rotate in a direction opposite to a direction in which the link members L3, L4 turn.

As shown in FIGS. 12 and 13, the link member L4 abuts against the engaging portion 114 of the link member L1, so that turning of the link member L4 is stopped. When an attitude of the link member L4 is fixed, attitudes of the link members L2, L3 are fixed. In the open state, the link member L3 is tilted slightly forward, and the link member L4 is tilted slightly rearward. In this case, the entire link members L1 to L4 are positioned upward of the main body 51. The coupler 121 of the link member L2 is positioned slightly rearward of the coupler 123 and upward of the coupler 123. Thus, the link member L2 is close to being in an upright attitude.

Figure 14:
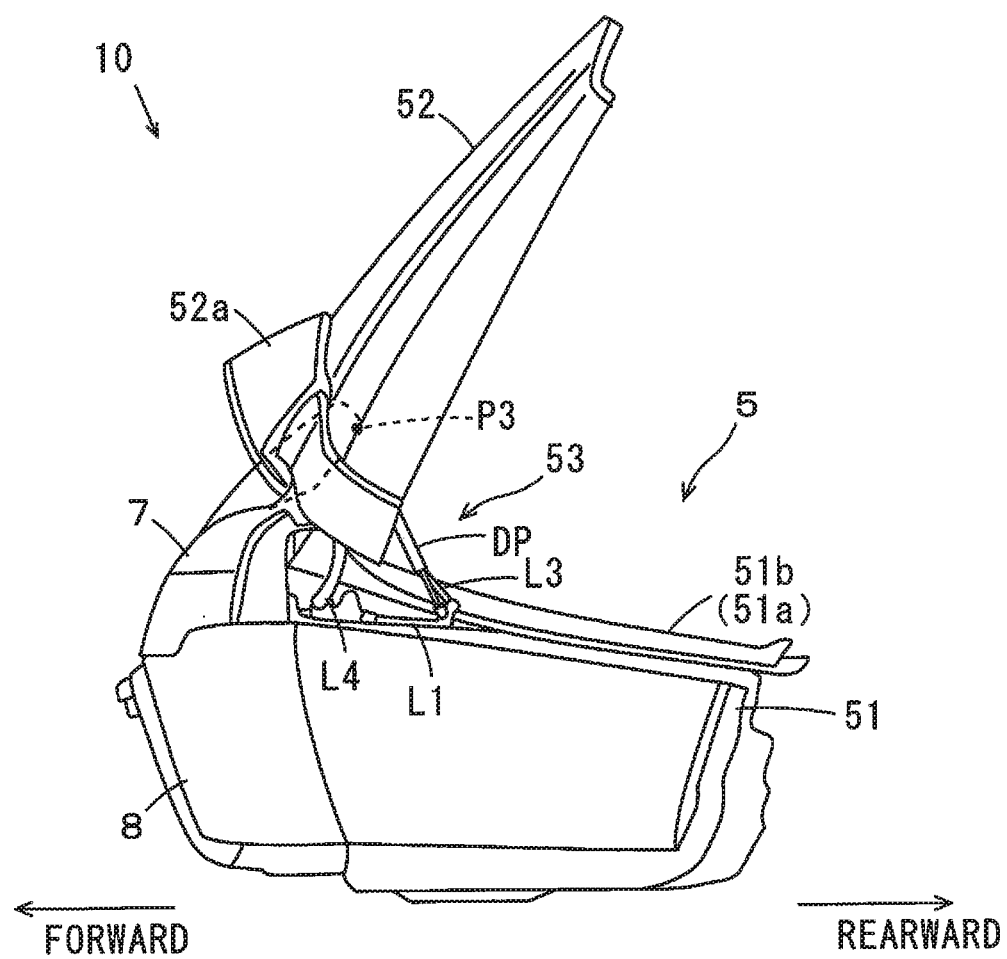
FIG. 14 is a side view of the rear unit in the open state.
Figure 15:
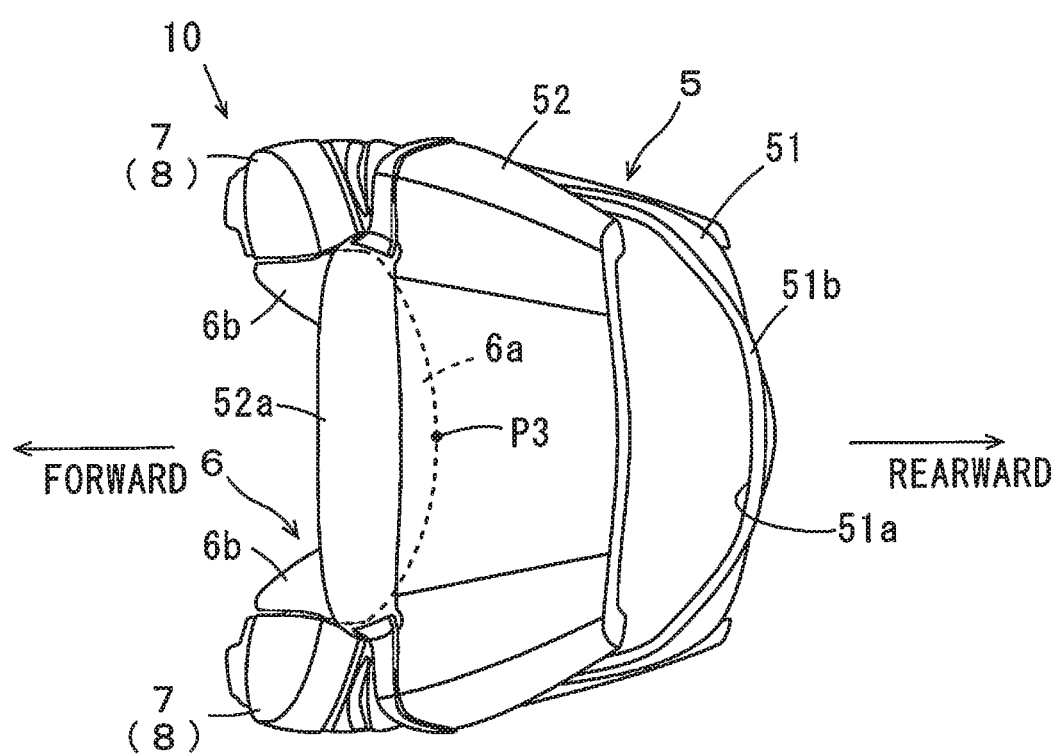
FIG. 15 is a plan view of the rear unit in the open state.

FIGS. 14 and 15 are a side view and a plan view of the rear unit 10 in the open state. The link mechanism 53 having the above-mentioned configuration is used, so that the lid portion 52 can be turned forward while being raised above the backrest 6. Therefore, interference between the lid portion 52 and the backrest 6 is avoided. As shown in FIG. 14, in the open state, part of the lid portion 52 is positioned upward of a rear end P3 of the backrest 6 in the side view of the vehicle. Further, in the open state, part of the link mechanism 53 can be viewed in the side view of the vehicle. Specifically, part of the link members L1, L3, L4 and the damper DP of the link mechanism 53 can be viewed. As shown in FIG. 15, part of the lid portion 52 is positioned forward of the rear end P3 of the backrest 6 in the plan view of the vehicle. In this case, the entire back surface portion 6a of the backrest 6 is covered by the lid portion 52.

Figure 16:
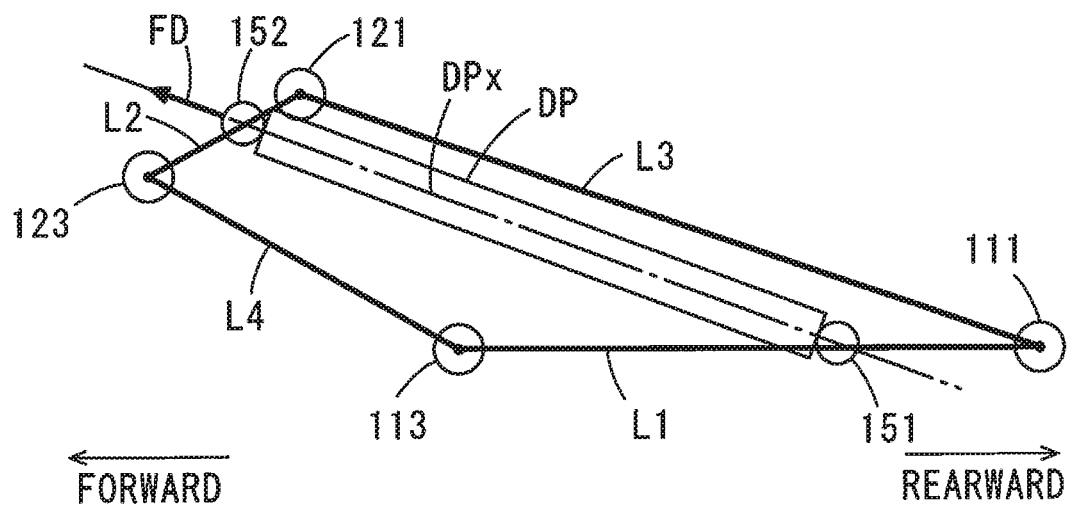
FIG. 16 is a diagram schematically showing a positional relationship between a link member and a damper.

FIG. 16 is a diagram schematically showing a positional relationship among the link members L1 to L4 and the damper DP in the close state in the side view of the vehicle. As shown in FIG. 16, the damper DP has an axial center DPx passing through a center of each of the coupling pieces 151, 152. In the close state, an extending line of the axial center DPx passes through a position above the coupler 123 of the link member L2 in the side view of the vehicle. In this case, a biasing force FD of the damper DP is exerted in a direction in which the link members L3, L4 are tilted forward. Thus, the force is exerted in a direction in which the lid portion 52 in the close position is further pressed against the main body 51. Therefore, even when vibration, shock or the like is applied to the storage box 5 during travelling of the motorcycle 100, the lid portion 52 can be stably maintained in the close position.

Figure 17:
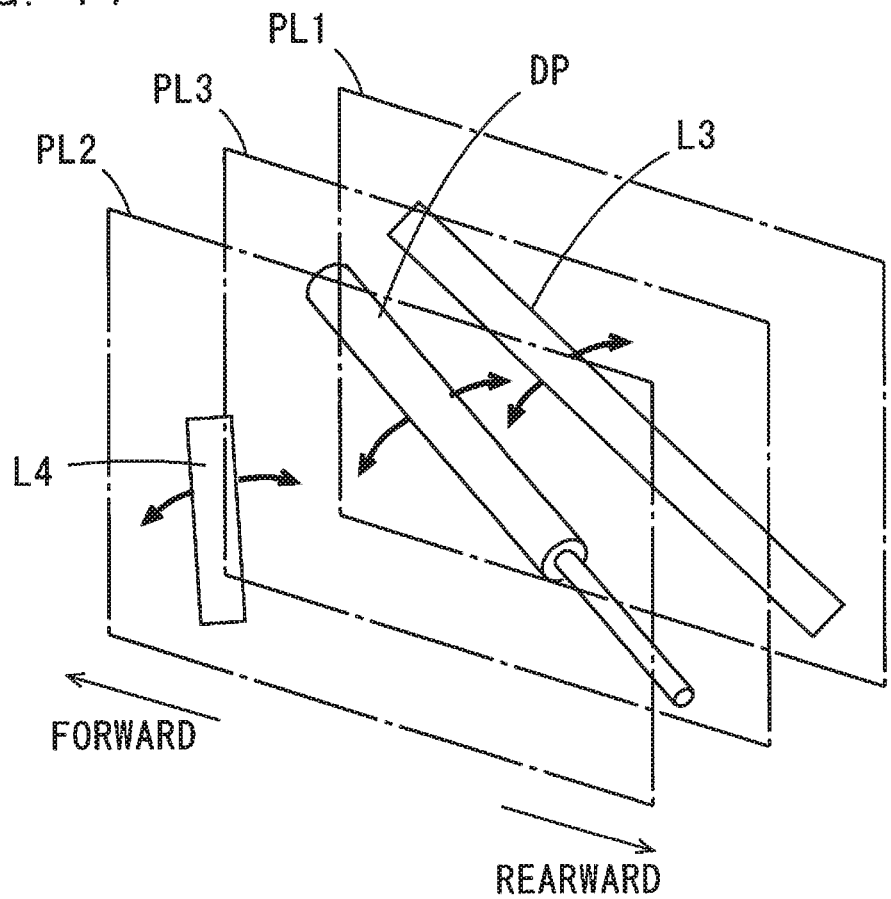
FIG. 17 is a schematic diagram for explaining turning positions of the link member and the damper.

FIG. 17 is a schematic diagram for explaining turning positions of the link members L3, L4 and the damper DP in the left link mechanism 53. As described above, in the left link mechanism 53, the link member L3 is arranged rightward of the damper DP, and the link member L4 is arranged leftward of the damper DP. Therefore, as shown in FIG. 17, the link member L3 turns in a virtual plane PL1, the link member L4 turns in a virtual plane PL2, and the damper DP turns in a virtual plane PL3.

Each of the planes PL1, PL2, PL3 is in parallel with the vehicle front-and-rear direction and the vehicle top-and-bottom direction. Further, the plane PL3 is positioned between the plane PL1 and the plane PL2. A distance between the place PL1 and the plane PL3 is preferably close to a distance between the plane PL2 and the plane PL3. In this case, because the damper DP is arranged between the link member L3 positioned inward and the link member L4 positioned outward, imbalance of exertion of the biasing force of the damper DP on the link mechanism 53 in the vehicle width direction is prevented. Therefore, good mechanical balance in the link mechanism 53 is acquired. As a result, deformation and damage of the link mechanism 53 are prevented, and good operability of the link mechanism 53 is acquired.

The right link mechanism 53 has a configuration laterally symmetric with that of the left link mechanism 53. Specifically, the link member L3 is arranged leftward of the damper DP, and the link member L4 is arranged rightward of the damper DP. Also in this case, imbalance of exertion of the biasing force of the damper DP on the link mechanism 53 is prevented similarly to the example of FIG. 17. Therefore, deformation and damage of the right link mechanism 53 are also prevented, and good operability of the right link mechanism 53 is acquired similarly to the left link mechanism 53.

[3] Speaker Devices and Storage

Figure 18:
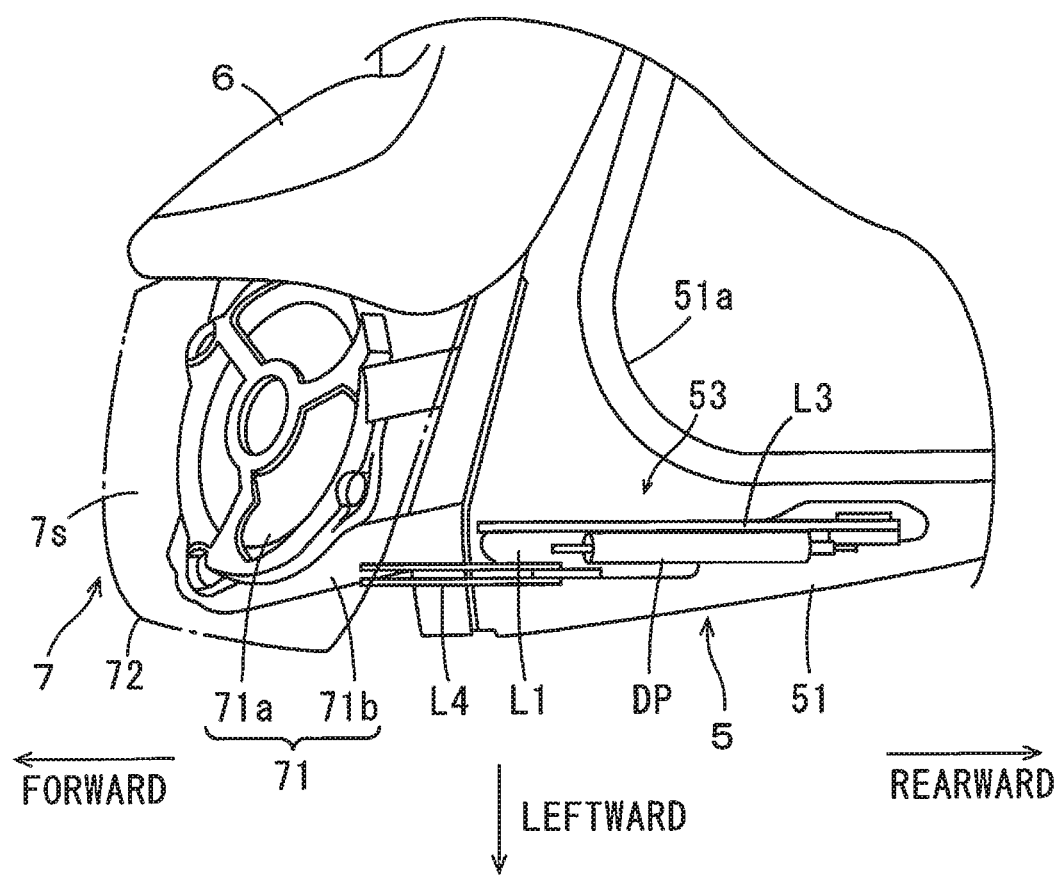
FIG. 18 is a plan view showing an inner configuration of a speaker device.
Figure 19:
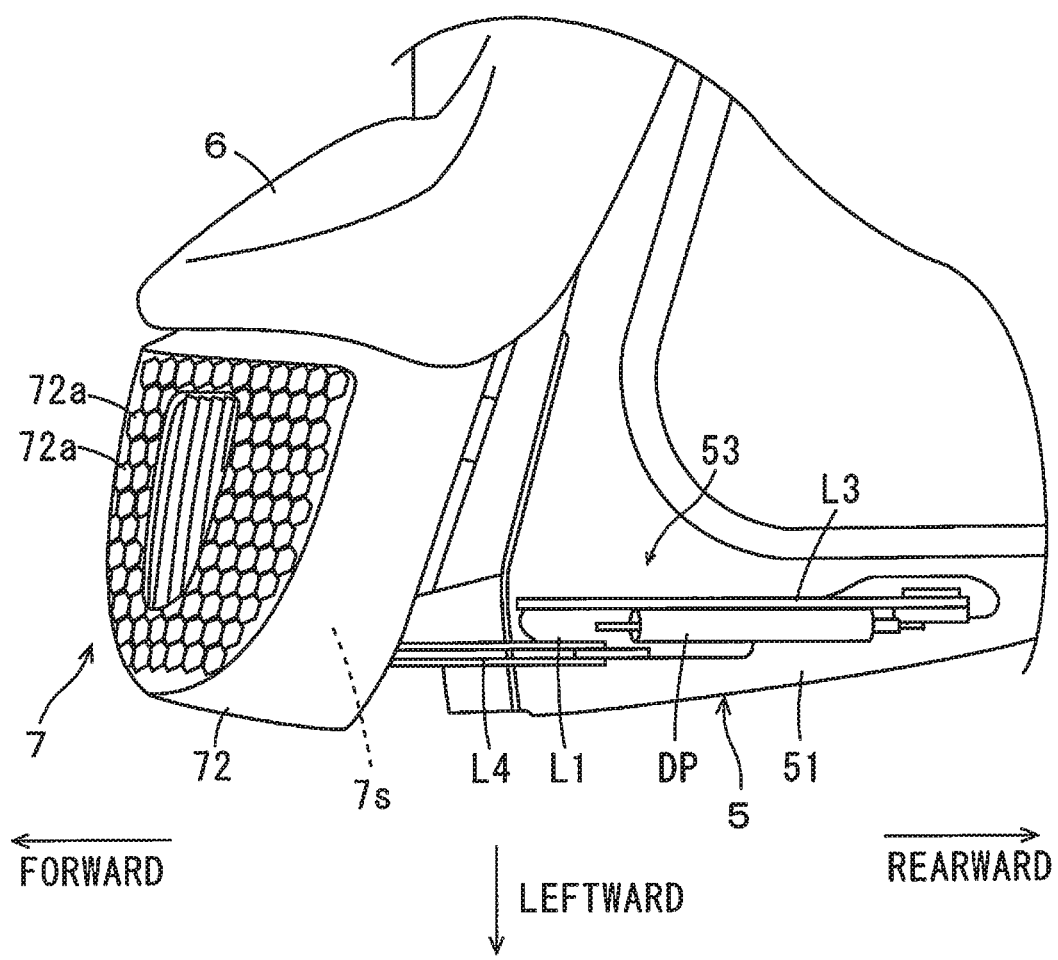
FIG. 19 is a plan view showing the appearance of the speaker device.

FIG. 18 is a plan view showing an inner structure of a speaker device 7. FIG. 19 is a plan view showing the appearance of the speaker device 7. In FIGS. 18 and 19, the left speaker device 7 of the pair of speaker devices 7 is shown. The right speaker device 7 has a configuration laterally symmetric with that of the left speaker device 7. In FIGS. 18 and 19, the lid portion 52 of the storage box 5 and the link member L2 of the link mechanism 53 are not shown.

As shown in FIGS. 18 and 19, the speaker device 7 includes a speaker unit 71 and a speaker cover 72. As shown in FIG. 18, the speaker unit 71 is a dynamic-type speaker unit, for example, and includes a vibration plate 71a and a supporter 71b. Air is vibrated by the vibration plate 71a, so that sound is generated. The supporter 71b supports the vibration plate 71a and is fixed to the main body 51 of the storage box 5. Thus, the speaker unit 71 is maintained in a constant attitude with respect to the main body 51. As shown in FIG. 19, the speaker cover 72 is provided to surround the speaker unit 71. A plurality of holes 72a for releasing the sound generated by the speaker unit 71 to the outside are formed in the speaker cover 72. The speaker cover 72 forms the speaker storage space 7s in which the speaker unit 71 is stored.

As shown in FIG. 18, the speaker unit 71 is directed forward in the vehicle front-and-rear direction, inward in the vehicle width direction and upward in the vehicle top-and-bottom direction. In this case, the speaker unit 71 is directed towards heads of the driver and the passenger who are seated on the driver seat 41 and the passenger seat 42 of FIG. 1. Specifically, an axial center of the vibration plate 71a is inclined in each of the vehicle front-and-rear direction, the vehicle width direction and the vehicle top-and-bottom direction, and the heads of the driver and the passenger are positioned within a constant angular range centered at the axial center. Thus, riders who are seated on the seat 4 easily hear the sound generated by the speaker unit 71.

Further, the speaker unit 71 is arranged as described above, so that part of the link mechanism 53 can protrude into the speaker storage space 7s. In FIGS. 18 and 19, the link mechanism 53 in the close state is shown. As described above, in the close state, part of the link mechanism 53 protrudes forward from the main body 51 and is positioned in the speaker storage space 7s. Specifically, part of the link members L2, L4 of the link mechanism 53 is positioned in the speaker storage space 7s (see FIG. 9). As shown in FIG. 18, in the close state, part of the link mechanism 53 (parts of the link members L2, L4) overlaps with the supporter 71b in the plan view of the vehicle. Further, in the close state, part of the link mechanism 53 (parts of the link members L2, L4) overlaps with the speaker unit 71 in the side view of the vehicle. In this case, a space formed in the speaker cover 72 can be effectively utilized. Thus, the size of the speaker device 7 can be inhibited from increasing.

Figure 20:
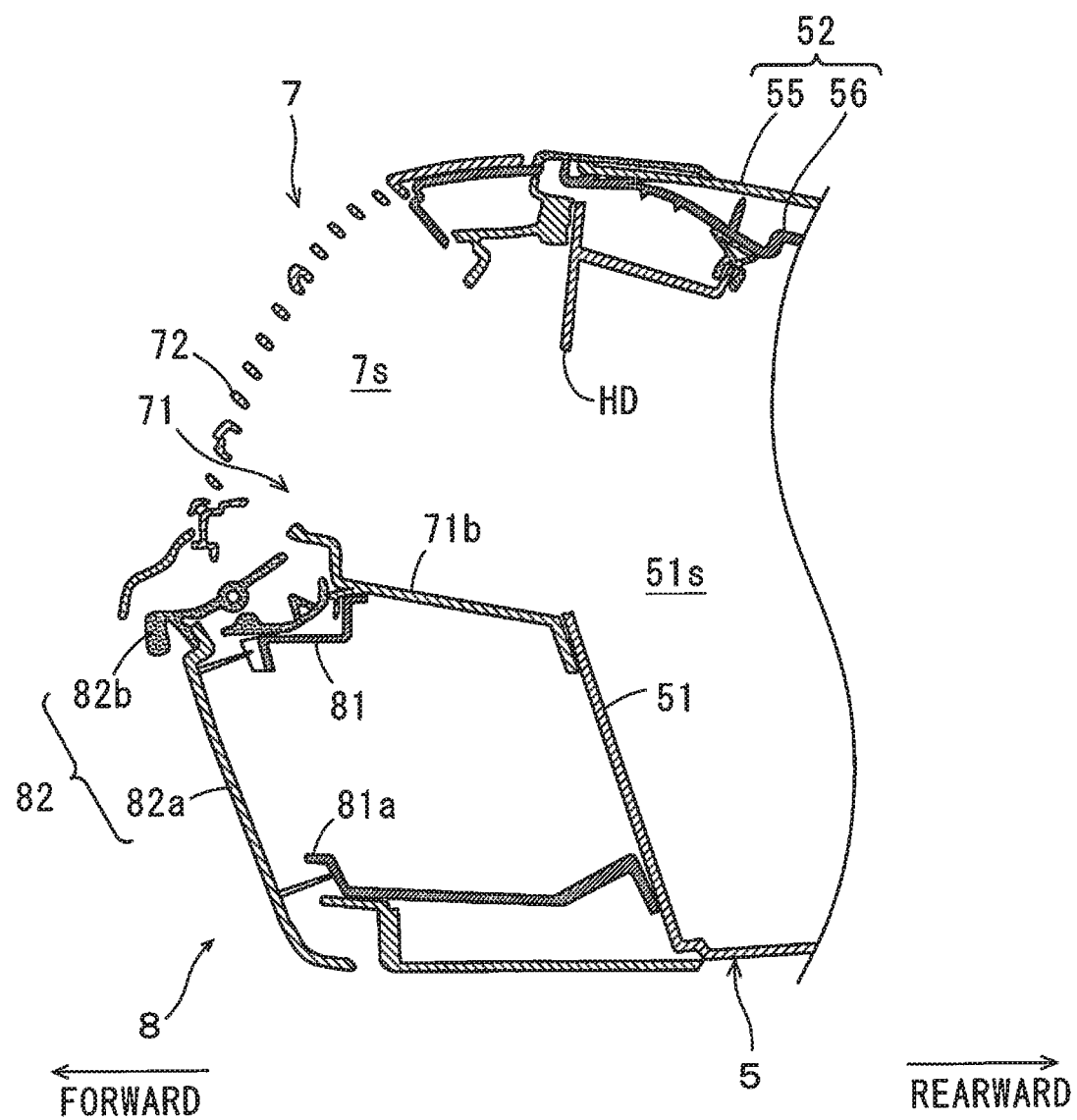
FIG. 20 is a cross sectional view of the speaker device and a storage.

FIG. 20 is a cross sectional view of the speaker device 7 and the storage space 8. A cross section of FIG. 20 corresponds to a cross sectional view taken along the line B-B of FIG. 3. In FIG. 20, the vibration plate 71a (FIG. 18) of the speaker unit 71 is not shown. As shown in FIG. 20, in the speaker storage space 7s formed by the speaker cover 72, the supporter 71b of the speaker unit 71 is fixed to a front surface of the main body 51 of the storage box 5. An opening HD is formed in the main body 51 at a position rearward of the speaker unit 71. The storage space 51*s* of the main body 51 and the speaker storage space 7*s* communicate with each other through the opening HD.

A space is formed below the speaker device 7 due to an increase in storage capacity of the main body 51. The storage space 8 is provided in the space. The storage space 8 includes a casing 81 and a lid portion 82. The casing 81 is fixed to the supporter 71*b* of the speaker unit 71 and the main body 51. The casing 81 has an opening 81*a* that is opened forward. The lid portion 82 includes an open-close portion 82*a* and an engaging portion 82*b*. The open-close portion 82*a* is attached to a lower portion of the casing 81 to be turnable. The open-close portion 82*a* turns with respect to the casing 81, so that the opening 81*a* of the casing 81 is opened or closed. The engaging portion 82*b* is attached to an upper portion of the casing 81. With the opening 81*a* closed by the open-close portion 82*a*, an upper end of the open-close portion 82*a* is engaged with the engaging portion 82*b*. Therefore, turning of the open-close portion 82*a* is restricted, and the opening 81*a* is maintained closed by the open-close portion 82*a*. Relatively small luggage such as keys, a smartphone or the like can be stored in a space surrounded by the front surface of the main body 51, the casing 81 and the open-close portion 82*a*.

[4] Effects

In the motorcycle 100 according to the present embodiment, the lid portion 52 of the storage box 5 is coupled by the pair of left and right link mechanisms 53 to the main body 51 to be turnable between the open position and the close position. In this case, the lid portion 52 can be turned between the close position and the open position not to interfere with the backrest 6. Thus, it is possible to largely open the lid portion 52 without reducing the thickness of the backrest 6. Therefore, a cushioning property of the backrest 6 can be ensured, and the luggage can be easily taken in and out from the main body 51 of the storage box 5 without a reduction in comfort of the rider.

Further, the speaker unit 71 of the speaker device 7 is directed forward, inward and upward. In this case, the rider seated on the seat 4 easily hears the sound generated by the speaker unit 71. Further, part of the link mechanism 53 can be arranged in the speaker storage space 7*s* in the close state. Thus, a space occupied by the link mechanism 53 in the main body 51 can be reduced. Therefore, storage capacity for the luggage in the main body 51 can be increased.

Further, in the present embodiment, the pair of storage spaces 8 is provided in the space that is formed due to an increase in storage capacity of the storage box 5. Thus, it is possible to ensure sufficient storage capacity without forming a wasteful space.

[5] Other Embodiments

While the backrest 6 is provided for the passenger in the above-mentioned embodiment, the backrest 6 may be provided for the driver. In this case, the passenger seat 42 is not provided, and the backrest 6 is provided between the driver seat 41 and the storage box 5.

While the pair of storage spaces 8 is arranged below the pair of speaker devices 7 in the above-mentioned embodiment, the pair of storage spaces 8 may be arranged above the pair of speaker devices 7. Further, another electronic device, another structure or the like may be provided instead of the storage spaces 8. Alternatively, a space may be formed below the speaker device 7.

While the above-mentioned embodiment is an example in which the present invention is applied to the motorcycle, the present invention may be applied to another straddled vehicle such as a motor tricycle or an ATV (All Terrain Vehicle).

[6] Correspondences Between Constituent Elements in Claims and Parts in Preferred Embodiments In the following paragraphs, non-limiting examples of correspondences between various elements recited in the claims below and those described above with respect to various preferred embodiments of the present invention are explained.

In the above-mentioned embodiment, the motorcycle 100 is an example of a straddled vehicle, the seat 4 is an example of a seat, the storage box 5 is an example of a storage box, the backrest 6 is an example of a backrest, the speaker device 7 is an example of a speaker device, the main body 51 is an example of a main body, the opening 51*a* is an example of a first opening, the lid portion 52 is an example of a lid portion, the link mechanism 53 is an example of an unequal length link mechanism, the speaker unit 71 is an example of a speaker unit and the speaker cover 72 is an example of a speaker cover.

Further, the link member L1 is an example of a first link member, the link member L2 is an example of a second link member, the link member L3 is an example of a third link member, the link member L4 is an example of a fourth link member, the coupler 111 is an example of a first coupler, the coupler 113 is an example of a second coupler, the coupler 121 is an example of a third coupler, the coupler 123 is an example of a fourth coupler, the damper DP is an example of a damper, the coupling piece 151 is an example of a first end portion, the coupling piece 152 is an example of a second end portion, the damper attachment portion 112 is an example of a first attachment portion and the damper attachment portion 122 is an example of a second attachment portion.

Further, a plane PL1 is an example of a first plane, the plane PL2 is an example of a second plane, the plane PL3 is an example of a third plane, the storage space 8 is an example of a storage space, the opening 81*a* is an example of a second opening, the lid portion 82 is an example of a storage lid portion, the lower wall portion 510 is an example of a lower wall portion, the upper wall portion 520 is an example of an upper wall portion, and the support surface 530*a* is an example of a support surface.

As each of constituent elements recited in the claims, various other elements having configurations or functions described in the claims can be also used.

While preferred embodiments of the present invention have been described above, it is to be understood that variations and modifications will be apparent to those skilled in the art without departing the scope and spirit of the present invention. The scope of the present invention, therefore, is to be determined solely by the following claims.

INDUSTRIAL APPLICABILITY

The present invention can be effectively utilized for various types of straddled vehicles.

What is claimed is:

1. A straddled vehicle comprising:
a seat;
a storage box provided rearward of the seat in a vehicle front-and-rear direction in a plan view of the vehicle;
a backrest provided between the seat and the storage box in the plan view of the vehicle; and
a pair of left and right speaker devices provided to sandwich the backrest in a vehicle width direction, wherein
the storage box includes
a main body having a first opening that is opened upward in a vehicle top-and-bottom direction,
a lid portion provided to be able to open and close the first opening, and
a pair of left and right unequal length link mechanisms that couples the lid portion to the main body such that the lid portion is turnable between an open position in which the first opening is opened and a close position in which the first opening is closed,
each of the pair of speaker devices includes
a speaker unit that generates sound, and
a speaker cover that forms a speaker storage space in which the speaker unit is stored,
the speaker unit is directed forward in the vehicle front-and-rear direction, inward in the vehicle width direction and upward in the vehicle top-and-bottom direction,
with the lid portion in the close position, parts of the pair of unequal length link mechanisms are respectively positioned in the speaker storage spaces of the pair of speaker devices, and
with the lid portion in the open position, part of the lid portion is positioned forward of a rear end of the backrest in the vehicle front-and-rear direction in the plan view of the vehicle.

2. The straddled vehicle according to claim 1, wherein
each of the pair of unequal length link mechanisms includes
a first link member fixed to the main body,
a second link member fixed to the lid portion, and
third and fourth link members that couple the first link member to the second link member,
the first link member has
a first coupler, and
a second coupler positioned forward of the first coupler in the vehicle front-and-rear direction,
the second link member has
a third coupler, and
a fourth coupler positioned forward of the third coupler in the vehicle front-and-rear direction with the lid portion in the close position,
the third link member is attached to the first and third couplers to be turnable such that a distance between the first coupler and the third coupler is maintained,
the fourth link member is attached to the second and fourth couplers such that a distance between the second coupler and the fourth coupler is maintained, and
the distance between the first coupler and the third coupler is larger than the distance between the second coupler and the fourth coupler.

3. The straddled vehicle according to claim 2, wherein
each of the pair of unequal length link mechanisms further includes a damper having first and second end portions,
the first link member further has a first attachment portion to which the first end portion of the damper is attached,
the second link member further has a second attachment portion to which the second end portion of the damper is attached, and
the damper biases the first and second link members in directions in which the first and second attachment portions move away from each other.

4. The straddled vehicle according to claim 3, wherein
the damper has an axial center passing through the first and second end portions, and
with the lid portion in the close position, an extending line of the axial center of the damper passes through a position above the fourth coupler of the second link member in the vehicle top-and-bottom direction in a side view of the vehicle.

5. The straddled vehicle according to claim 3, wherein
the third link member moves in a first plane as the lid portion turns,
the fourth link member moves in a second plane as the lid portion turns, and
the damper is arranged to move in a third plane, which is positioned between the first plane and the second plane, as the lid portion turns.

6. The straddled vehicle according to claim 1, wherein
with the lid portion in the close position, parts of the pair of unequal length link mechanisms respectively overlap with the speaker unit of the pair of speaker devices in a side view of the vehicle.

7. The straddled vehicle according to claim 1, further comprising a pair of left and right storage spaces respectively provided below the pair of speaker devices, wherein
each of the pair of storage spaces includes
a casing having a second opening, and
a storage lid portion provided to be able to open and close the second opening.

8. The straddled vehicle according to claim 1, wherein
the main body includes
a pair of left and right lower wall portions, and
a pair of left and right upper wall portions provided above the pair of lower wall portions in the vehicle top-and-bottom direction in a side view of the vehicle,
the pair of upper wall portions is positioned inward of the pair of lower wall portions in the plan view of the vehicle,
a pair of left and right support surfaces is formed to couple lower ends of the pair of upper wall portions to upper ends of the pair of lower wall portions, and
the pair of unequal length link mechanisms is respectively fixed onto the pair of support surfaces.

* * * * *